Patented Dec. 26, 1944

2,365,783

UNITED STATES PATENT OFFICE 2,365,783

SULPHONATION OF BRANCHED CHAIN OLEFINS

Chester Merle Suter, Evanston, Ill., assignor to The Procter & Gamble Company, Cincinnati, Ohio, a corporation of Ohio No Drawing. Application July 23, 1940, Serial No. 346,992

8 Claims. (Cl. 260—513)

My invention relates to the sulphonation of branched chain olefins.

In this specification the terms sulphonate and sulphonic are employed in their strict meaning, referring to the

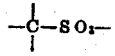

grouping, and the terms sulphate or sulphuric are employed when referring to the sulphuric ester or

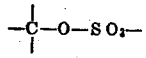

grouping, except that the term "sulphonating agent" is employed in the broad sense to denote an agent which may be both a sulphonating and a sulphating agent, and the term "sulphuric reaction products" is also employed in a similar broad sense.

Objects of my invention are:

To produce sulphonic acids containing olefin linkages.

To produce olefin monosulphonic acids in which the sulphonate group is attached to a saturated carbon atom, leaving the double bond free to participate in subsequent condensations or other reactions.

To produce mono- and disulphonic acids from olefins without destroying the double bond.

To produce salts of the above mentioned sulphonic acids.

To produce unsaturated substances having wetting, sudsing and detergent properties.

To produce intermediates for use in the synthesis of substances having superior wetting, sudsing and detergent properties.

To accomplish the above objects by direct sulphonation of branched chain olefins.

Heretofore it has been difficult to sulphonate organic compounds containing an olefin double bond without saturating or destroying this bond. Sulphonic derivatives containing an olefin linkage would, if inexpensively made, have commercial importance in the manufacture of surface-active compounds possessing wetting and detergent properties. Attempts to sulphonate branched chain olefins by means of common acid sulphonating agents have usually resulted in polymerization, to which these compounds are especially susceptible.

In my United States Patents 2,098,114 and 2,135,358, I have described sulphation and sulphonation processes in which addition products of dioxane and either sulphur trioxide or chlorsulphonic acid were employed as "sulphonating agents." These patents disclosed, respectively, the formation of sulphuric esters of saturated alcohols, and the formation from olefins (especially from straight chain olefins) of saturated sulphuric reaction products including sulphate-sulphonates and hydroxy-sulphonates wherein the sulphonate group is added at the double bond. McAllister, using the same "sulphonating agents," disclosed in U. S. Patent No. 2,099,214 the formation of sulphuric esters of unsaturated alcohols.

My present invention is based on my discovery that the sulphonation of tertiary olefins (that is, olefins having two alkyl groups and a double bond on the same carbon atom) having a hydrogen atom attached to a carbon atom in an allyl position, by means of such sulphonating agents as the addition products of dioxane and sulphur trioxide yields unsaturated branched chain true sulphonic acids or their derivatives wherein the sulphonate group is substituted for a hydrogen atom and does not saturate the double bond. This reaction is therefore unlike that which predominates when a straight chain olefin is treated with such a sulphonating agent. It appears that the structure of branched chain olefins is such that hydrogen atoms in the allyl position are more reactive towards the reagent than is the double bond.

Although dioxane sulphotrioxide, the reaction product of dioxane and sulphur trioxide, is a convenient and suitable sulphonating agent for use in my process, other sulphonating agents may be substituted, especially dioxane chlorosulphonate which is the addition product of dioxane and chlorsulphonic acid. This latter agent is somewhat less reactive than dioxane sulphotrioxide and usually requires a somewhat higher reaction temperature. When dioxane chlorosulphonate is used the hydrochloric acid which it liberates may, unless quickly removed, react with unsulphonated olefin to form alkyl chloride as a by-product of the process.

Although the present application is limited to the use of dioxane to "cushion" the action of the sulphonating agent, I also contemplate the use of other stable ethers which like dioxane are capable of forming addition products with sulphur trioxide as substitutes for dioxane.

In carrying out my process in a typical preferred manner, for example when using dioxane sulphotrioxide as the sulphonating agent, I first prepare this agent by adding one to two mols of sulphur trioxide to each mol of dioxane dissolved in a convenient quantity of a suitable solvent, as hereinafter further explained, at a temperature low enough to retard evaporation and side reactions: for instance 100 parts of sulphur trioxide is added to a solution of 73.3 parts of 1,4-dioxane dissolved in 300 parts of ethylene chloride at a temperature below 20° C. Most of the resulting dioxane sulphotrioxide precipitates as a white solid. I then add, while agitating this slurry of dioxane sulphotrioxide, one half mol of the olefin to be sulphonated per mol of sulphur trioxide if two sulphonate groups are desired in the product; but if only one sulphonate group is desired in the product I employ at least one, and usually more than one, mol of olefin per mol of sulphur trioxide and in this case I prefer to add the sulphonating agent to the olefin. The sulphonation reaction usually proceeds rapidly. After its completion an aqueous solution of an acid neutralizing substance may be added, until the mixture becomes neutral, to produce the corresponding salt of olefin sulphonic acid. The solvent and the dioxane may be separated from this sulphonate product either mechanically or by distillation.

Solvents for use in my process should dissolve both dioxane and the olefin to be sulphonated, should not themselves react with the sulphonating agent with sufficient rapidity to interfere with their use, and should be readily separable from the final reaction products, for example by evaporation or fractionation. The term "suitable solvent" is employed in this sense. Among the solvents that have been employed are: an excess of dioxane itself, ethylene chloride, chloroform, carbon tetrachloride, symmetrical tetrachlorethane, pentane, and petroleum ether.

Several examples of the formation of olefin sulphonic acids and sulphonates by my process are given below. In these the term "parts" signifies parts by weight.

*Example 1—To make isobutylene disulphonic acid,* I add 35 parts of isobutylene to an amount of dioxane sulphotrioxide slurry containing 100 parts of sulphur trioxide, made as previously described. An excellent yield is obtained at a reaction temperature of about 15° C. At lower temperatures the yield is less, and at higher temperatures than 25° C. side reactions become noticeable. The dioxane sulphotrioxide reacts and is used up and the dioxane salt of the disulphonic acid usually separates out. In some cases the yield is increased, after the reaction at low temperature has slowed down, by warming the reaction mixture to about 60° C. for a short time, followed by cooling to about 0° C. The dioxane disulphonate is readily removed by filtration and may be converted into sodium isobutylene disulphonate by treatment with aqueous sodium hydroxide followed by evaporation of the water and dioxane. The structure of sodium isobutylene disulphonate made in this manner was found to be

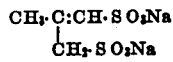

By substituting dioxane chlorosulphonate for dioxane sulphotrioxide in this sulphonation, the same isobutylene disulphonic acid is obtained.

The dioxane salt of isobutylene disulphonic acid is suitable for preparing derivatives such as isobutylene disulphonic anhydride or isobutylene disulphonyl chloride.

*Example 2—To make isobutylene monosulphonic acid,* I rapidly add the slurry of dioxane sulphotrioxide already described to an excess of isobutylene dissolved in a solvent (suitably 100 parts of isobutylene dissolved in 200 parts of ethylene chloride, per 100 parts of sulphur trioxide in the sulphonating agent slurry), at a temperature of about 0° to −10° C. After the reaction is complete as indicated by disappearance of the precipitate, which requires only a few minutes, an aqueous alkali may be added until the mixture becomes neutral. The ethylene chloride layer containing much of the dioxane may then be separated mechanically or by steam distillation. If a base is used which yields an insoluble sulphate, as barium hydroxide, I filter the aqueous layer before evaporation to dryness; if an alkali metal hydroxide is used, I evaporate to dryness without filtering. The dry residue is the crude salt of isobutylene monosulphonic acid, which is suitable for preparing reaction products of this compound. The sodium salt may be purified by crystallization from alcohol. Its structure is found to be

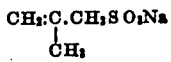

If in the monosulphonation of isobutylene the dioxane sulphotrioxide slurry is added to the olefin solution over a period of several hours much polymerization occurs and the product contains sulphonates of polymers, as for example a di-isobutylenemonosulphonic acid salt.

*Example 3—Sulphonation of 2-methyl-2-hexadecene.*—To 38 parts of dioxane in 375 parts of ethylene chloride 70 parts of sulphur trioxide was added, and to this slurry at about 0° to 10° C. was added with vigorous stirring 100 parts of 2-methyl-2-hexadecene. The solid sulphonating agent soon disappeared and the mixture became clear. About 800 parts of water were then added; after twenty-four hours the lower or ethylene chloride layer was separated, washed with more water, the water extracts combined and neutralized with sodium hydroxide. The solution was evaporated to a volume about equal to that of 300 parts of water. Upon cooling, light yellow crystals formed, and these were dried. This sodium sulphonate of 2-methyl hexadecene has good detergent, sudsing, and wetting action. It decolorizes bromine water in the cold, and reduces potassium permanganate in the cold, thus showing the presence of an olefin linkage. It has an iodine value of 70, which is 98% of its theoretical iodine value.

*Example 4—Sulphonation of triisobutylene.*—To a solution of 52 parts of dioxane in 375 parts of ethylene chloride 50 parts of 60% oleum was added. To the resulting mixture, which contained dioxane sulphate as well as the dioxane sulphotrioxide, 32 parts of triisobutylene was added, keeping the temperature at 0–6° C. After addition was complete there remained a sludge of the unreacted dioxane sulphate. Water was added, the mixture neutralized with sodium hydroxide and the two layers separated. Evaporation of the water layer to dryness gave the crude sodium sulphonate of triisobutylene. Its unsaturated nature is shown by its ability to reduce neutral permanganate and react with bromine water at room temperature. The crude product has an iodine value of 58, which is 62% of the theoretical value for the pure product. This product, containing twelve carbon atoms per molecule, has definite wetting and sudsing properties.

*Example 5—Sulphonation of 2-methyl-1-butene.*—Sulphur trioxide was passed into a vigorously stirred solution containing 18.6 parts of dioxane in 100 parts of ethylene chloride until the increase in weight was 24.0 parts. Pure 2-methyl-1-butene was added until the dioxane sulphotrioxide dissolved, keeping the reaction mixture below 10° C.; 9.5 parts of the olefin was needed. On standing in the refrigerator only a small amount of dioxane disulphonate precipitates but when the mixture was warmed to room temperature and then cooled a copious precipitate of this product appeared. The barium salt of 2-methyl-1-butene disulphonic acid, obtained by neutralizing the reaction mixture with aqueous barium hydroxide and removing any barium sulphate by filtration and evaporating the filtrate to dryness, was found to reduce potassium permanganate and react readily with bromine water.

In place of ethylene chloride, an equal amount of symmetrical tetrachlorethane may be substituted with satisfactory results.

I have found that the unsaturated sulphonic acids and sulphonates made by my process retain the typical properties of compounds containing an olefin double bond. For example, they (especially the monosulphonates) may be condensed with aromatic compounds to produce substances of higher molecular weight, among which are valuable surface-active substances, or they may undergo other reactions typical of olefinic subtances such as decolorizing bromine water to form bromine addition products and reducing potassium permanganate. Furthermore, the sulphonic acid group retains its usual properties, and sulphonyl chlorides such as 2-methyl propene sulphonyl chloride have been prepared. As a result of these properties the sulphonic acids derived from branched chain olefins are useful intermediates for the synthesis of many organic compounds having practical value. I have also found that the higher molecular weight members of the branched chain olefin sulphonic acid series and their water soluble salts, especially those containing twelve or more carbon atoms per molecule, are surface active substances and possess wetting, sudsing, and detergent properties.

A general formula for branched chain olefins which may be sulphonated according to my process is:

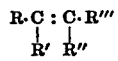

in which R and R' represent either hydrogen atoms or alkyl groups and R'' and R''' represent alkyl groups, any two or more of which alkyl groups may be alike and at least one of which contains a hydrogen atom attached to a carbon atom in an allyl position, which is a position once removed from the double bond.

The structures of branched chain monosulphonic acids made by my process may be represented by the general formula:

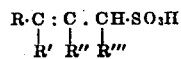

in which R, R', R'', and R''' represent either hydrogen atoms or alkyl groups, any two or more of which alkyl groups may be alike, provided that when either R or R' are hydrogen atoms R'' is an alkyl group and that when R'' is a hydrogen atom both R and R' are alkyl groups.

More specifically, monosulphonic acids made by my process include:

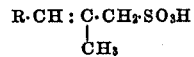

in which R may be hydrogen or an alkyl group.

Disulphonic acids made by my process may be represented by the general formula:

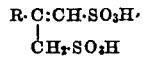

in which R is an alkyl group.

Although my present invention is directed to the production of unsubstituted branched chain olefin sulphonic acids and their salts, nevertheless I contemplate also the employment of my present process for the sulphonation of substituted olefins in which the substituent does not react with the sulphonating agent, such as halogen substituted olefins, to produce the corresponding substituted unsaturated sulphonic acids.

Having thus described my invention, what I claim and desire to secure by Letters Patent is:

1. The process of making branched chain olefin sulphonic acids which comprises reacting branched chain olefins having two alkyl groups and a double bond on the same carbon atom, and a hydrogen atom in an allyl position, with the addition product of dioxane and a sulphonating agent selected from the group consisting of sulphur trioxide and chlorsulphonic acid.

2. The process of making branched chain olefin sulphonic acids which comprises reacting branched chain olefins having two alkyl groups and a double bond on the same carbon atom, and a hydrogen atom in an allyl position, with the addition product of dioxane and a sulphonating agent selected from the group consisting of sulphur trioxide and chlorsulphonic acid, in the presence of a suitable solvent.

3. The process of producing isobutylene sulphonic acids which comprises reacting isobutylene with the addition product of dioxane and a sulphonating agent selected from the group consisting of sulphur trioxide and chlorsulphonic acid.

4. 2-methyl 2-propene 1-sulphonic acid.

5. Unsaturated tertiary olefin monosulphonic acid containing at least twelve carbon atoms per molecule, and having the sulphonic acid group attached to a carbon atom in an allyl position.

6. Water soluble unsaturated tertiary olefin monosulphonates containing at least twelve carbon atoms per molecule, and having the sulphonate group attached to a carbon atom in an allyl position.

7. Unsaturated aliphatic tertiary olefin monosulphonates, having the sulphonate group attached to a carbon atom in an allyl position.

8. Tertiary olefin sulphonates of the general structure R·CH:C(CH₃)·CH₂·SO₃M, in which R represents a member of the group consisting of hydrogen and alkyl, and M represents a cation.

CHESTER MERLE SUTER.